US012350794B2

(12) United States Patent
Chen et al.

(10) Patent No.: US 12,350,794 B2
(45) Date of Patent: Jul. 8, 2025

(54) DRIVING HEAD-CHANGEABLE TOOL

(71) Applicant: YUAN LI HSING INDUSTRIAL CO., LTD., Taichung (TW)

(72) Inventors: Chia-Yi Chen, Taichung (TW); Hui-Chien Chen, Taichung (TW)

(73) Assignee: YUAN LI HSING INDUSTRIAL CO., LTD., Taichung (TW)

( * ) Notice: Subject to any disclaimer, the term of this patent is extended or adjusted under 35 U.S.C. 154(b) by 375 days.

(21) Appl. No.: 18/074,077

(22) Filed: Dec. 2, 2022

(65) Prior Publication Data

US 2024/0181610 A1 Jun. 6, 2024

(51) Int. Cl.
*B25B 23/00* (2006.01)

(52) U.S. Cl.
CPC ...... *B25B 23/0014* (2013.01); *B25B 23/0035* (2013.01)

(58) Field of Classification Search
CPC ............ B25B 23/0014; B25B 23/0021; B25B 23/0028; B25B 23/0035; F16D 3/185; F16D 3/223; F16D 2001/102; F16D 1/116; F16D 1/108
See application file for complete search history.

(56) References Cited

U.S. PATENT DOCUMENTS 4,807,499 A * 2/1989 Martinez ................ B25B 13/06 81/177.75
5,738,586 A * 4/1998 Arriaga .................. F16D 1/101 464/106
6,145,416 A * 11/2000 Bonniot .............. B25B 23/0035 81/177.8
8,176,817 B2 * 5/2012 Liu ......................... B25B 13/06 81/177.85
9,776,310 B2 * 10/2017 Chen .................... B25B 23/0035
10,391,616 B1 * 8/2019 Cantlon .............. B25B 23/0028
10,556,329 B2 * 2/2020 Peters ................. B23B 31/1071
11,007,625 B2 * 5/2021 Chen .................... B25B 23/0028
11,067,132 B2 * 7/2021 Su ........................... F16D 3/223
11,231,073 B2 * 1/2022 Chen .................... B25B 23/0028
11,420,309 B2 * 8/2022 Chen .................... B25B 23/0021
11,433,512 B1 * 9/2022 Doroslovac ............... F16C 3/02
2011/0179915 A1 * 7/2011 Peng ..................... B25B 15/001 81/177.75
2016/0265596 A1 * 9/2016 Yu ........................... F16D 3/185

* cited by examiner

*Primary Examiner* — David B. Thomas
(74) *Attorney, Agent, or Firm* — Muncy, Geissler, Olds & Lowe, P.C.

(57) ABSTRACT

A driving head-changeable tool is provided, including: a main body, including a chamber and an assembling end, the chamber including concave portions and convex portions alternatively arranged circumferentially, the chamber further including at least one receiving hole each receiving a blocking member; an outer sleeve, disposed around the main body, including a recess and a projection protrusive, the outer sleeve being slidable relative to the main body; wherein when the outer sleeve is located in a first position, the projection urges the blocking member to project within the chamber to retain the polygonal ball joint in the chamber; when the outer sleeve is located in a second position, the blocking member is retractable in the recess to be not protrusive within the chamber so that the polygonal ball joint is disengageable from the chamber.

8 Claims, 8 Drawing Sheets

DRIVING HEAD-CHANGEABLE TOOL

BACKGROUND OF THE INVENTION

Field of the Invention

The present invention relates to a driving head-changeable tool.

Description of the Prior Art

A hand tool with a universal joint can be used for multi-angle rotation, and it generally includes a ball socket and a drive rod. The drive rod includes a ball head at an end thereof. The ball head is slidably and non-rotatably assembled to the ball socket. When the drive rod is pulled to move outward relative to the ball socket to be located in a swingable position, the drive rod is swingable relative to the ball socket for carrying out multi-angle rotational operation, which is easy to operate in a narrow working environment. There are needs to replace the drive rod according to various driven members of different sizes or types. However, it is necessary to replace the entire set of the ball socket and the drive rod, and thus the operation is time-consuming and labor-intensive.

The present invention is, therefore, arisen to obviate or at least mitigate the above-mentioned disadvantages.

SUMMARY OF THE INVENTION

The main object of the present invention is to provide a driving head-changeable tool to which a driving head can be stably assembled and which is easy and quick to replace.

To achieve the above and other objects, a driving head-changeable tool is provided, including: a main body, including a chamber and an assembling end connected to each other, the chamber including a plurality of concave portions and a plurality of convex portions alternatively arranged circumferentially, the chamber being configured for insertion of a polygonal ball joint, the chamber further including at least one receiving hole disposed therethrough radially, each of the at least one receiving hole receiving a blocking member; an outer sleeve, disposed around the main body, an inner wall of the outer sleeve including a recess and a projection protrusive relative to the recess, the outer sleeve being slidable between a first position and a second position relative to the main body; wherein when the outer sleeve is located in the first position, the projection urges the blocking member to project within the chamber to retain the polygonal ball joint in the chamber; when the outer sleeve is located in the second position, the recess corresponds to the blocking member, the blocking member is retractable in the recess to be not protrusive within the chamber so that the polygonal ball joint is disengageable from the chamber.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
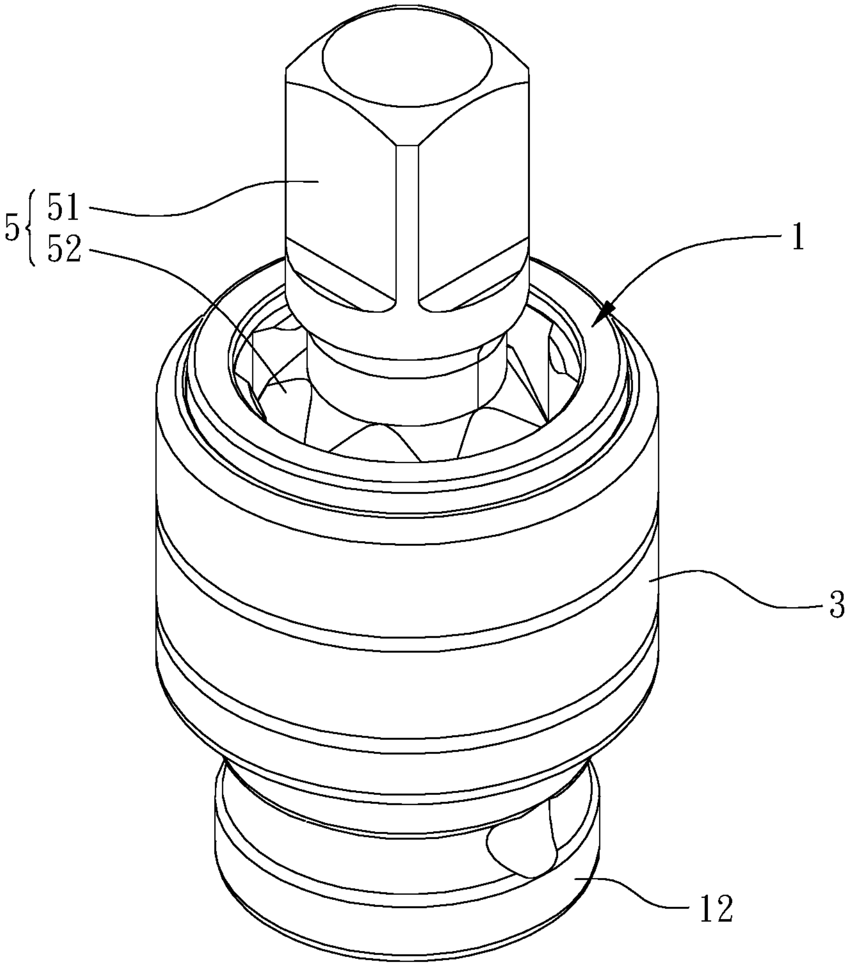
FIG. 1 is a stereogram of a first embodiment of the present invention.
Figure 2:
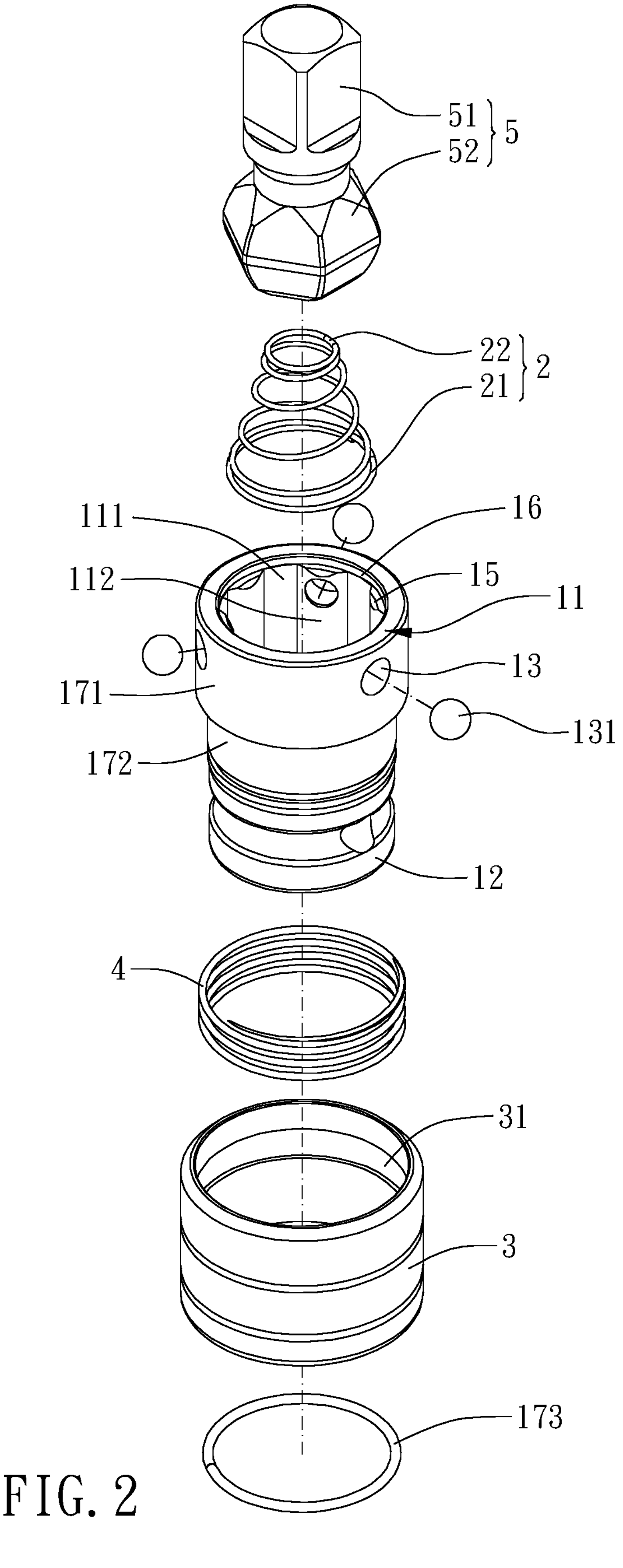
FIG. 2 is a breakdown drawing of the first embodiment of the present invention.
Figure 3:
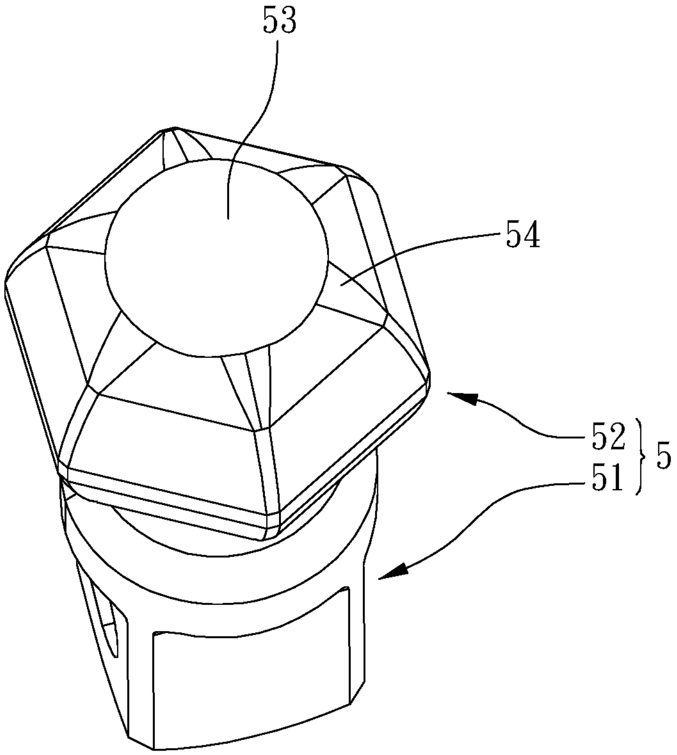
FIG. 3 is a stereogram of a polygonal ball joint according to the first embodiment of the present invention.
Figure 4:
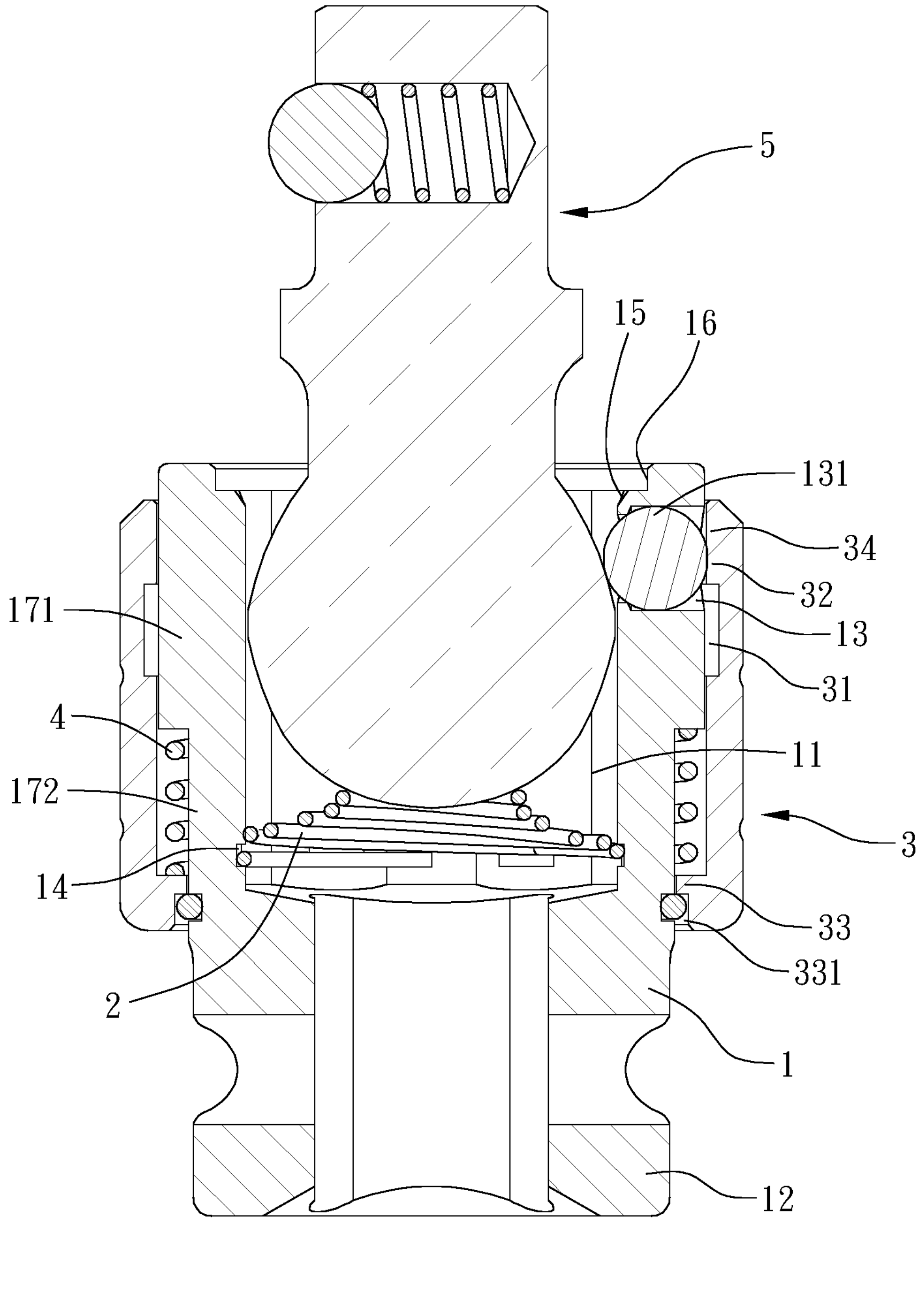
FIGS. 4 and 5 are cross-sectional views of the first embodiment of the present invention.
Figure 5:
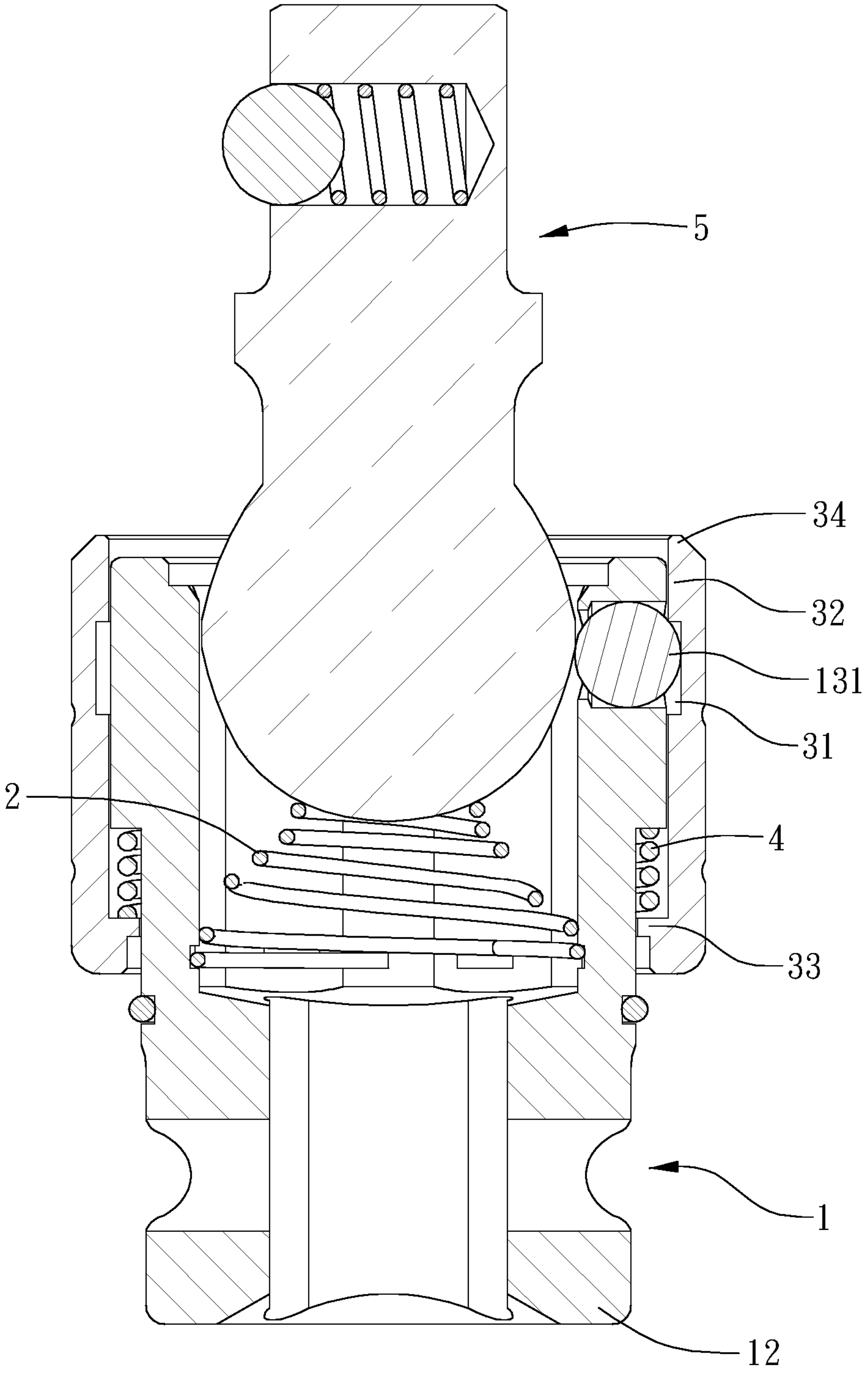

Please refer to FIGS. 1 to 5 for a first embodiment of the present invention. A driving head-changeable tool of the present invention includes a main body 1 and an outer sleeve 3.

The main body 1 includes a chamber 11 and an assembling end 12 connected to each other, and the chamber 11 includes a plurality of concave portions 111 and a plurality of convex portions 112 alternatively arranged circumferentially. The chamber 11 is configured for insertion of a polygonal ball joint 5, the chamber 11 further includes at least one receiving hole 13 disposed therethrough radially, and each of the at least one receiving hole 13 receives a blocking member 131. The assembling end 12 is configured to be assembled with a rotation tool.

In this embodiment, the driving head-changeable tool further includes a conical coil spring 2, the chamber 11 further includes an annular groove 14 adjacent to the bottom thereof, the conical coil spring 2 includes a large diameter end 21 and a small diameter end 22 opposite to each other, the large diameter end 21 is engaged within the annular groove 14, and the small diameter end 22 biases the polygonal ball joint 5 outwardly.

The outer sleeve 3 is disposed around the main body 1, an inner wall of the outer sleeve 3 includes a recess 31 and a projection 32 protrusive relative to the recess 31, and the outer sleeve 3 is slidable between a first position and a second position relative to the main body 1.

When the outer sleeve 3 is located in the first position, the projection 32 urges the blocking member 131 to project within the chamber 11 to retain the polygonal ball joint 5 in the chamber 11. Because the large diameter end 21 of the conical coil spring 2 is engaged within the annular groove 14, the conical coil spring 2 is retained in the chamber 11, and the polygonal ball joint 5 is biased outward by the conical coil spring 2 so that the polygonal ball joint 5 can swing effectively relative to the main body 1 for fastening operation. For replacing the polygonal ball joint 5, the outer sleeve 3 is moved toward the second position. When the outer sleeve 3 is located in the second position, the recess 31 corresponds to the blocking member 131, the blocking member 131 is retractable in the recess 31 to be not protrusive within the chamber 11 so that the polygonal ball joint 5 is disengageable from the chamber 11. The small diameter end 22 biases the polygonal ball joint 5 outwardly so that the polygonal ball joint 5 can project out from the main body 1, which is easy and convenient in use.

Specifically, an end of each of the plurality of convex portions 112 remote from a bottom of the chamber 11 includes a bevel 15, which allows smooth swinging of the polygonal ball joint 5 without affection of the convex portion 112.

The chamber 11 further includes a first stepped portion 16 near an opening thereof, and the first stepped portion 16 is next to the bevel 15. As such, it prevents the polygonal ball joint 5 from being interfered with the inner wall of the chamber 11 during rotation of the polygonal ball joint 5, thus being durable and with low noise.

Specifically, an outer circumferential surface of the main body 1 includes a large diameter section 171, a small diameter section 172 and a retainer 173. An inner circumferential surface of the outer sleeve 3 includes an inner flange 33, and the inner flange 33 is slidably restricted between the large diameter section 171 and the retainer 173. An elastic member 4 is disposed around the small diameter section 172 and abutted between the large diameter section 171 and the inner flange 33 so that the outer sleeve 3 is normally biased toward the first position to avoid disengagement of the outer sleeve 3 from the main body 1.

Preferably, a side of the inner flange 33 remote from the elastic member 4 includes a second stepped portion 331. When the outer sleeve 3 is located in the first position, the retainer 173 is received within second stepped portion 331, which prevents the retainer 173 from external colliding or impact. In this embodiment, the retainer 173 is C-shaped, which is easy to assemble/disassemble and/or replace.

An end of the inner circumferential surface of the outer sleeve 3 remote from the inner flange 33 includes a flat section 34. When the outer sleeve 3 is located in the first position, the large diameter section 171 of the main body 1 is protrusive beyond the flat section 34, and when the outer sleeve 3 is located in the second position, the large diameter section 171 of the main body 1 is non-protrusive relative to the flat section 34. In this embodiment, the at least one receiving hole 13 is disposed through the large diameter section 171, and the flat section 34 and the projection 32 have same thicknesses.

The polygonal ball joint 5 includes a working portion 51 and a polygonal ball head 52 connected to each other, and an end of the polygonal ball head 52 remote from the working portion 51 includes a circular end surface 53. The small diameter end 22 is abutted against the circular end surface 53, and the small diameter end 22 has a relatively small diametric dimension and is abuttable against the circular end surface 53, so the polygonal ball joint 5 can swing smoothly relative to the main body 1. A plurality of arcuate corner portions 54 are connected to a periphery of the circular end surface 53, the plurality of arcuate corner portions 54 extend radially, and the small diameter end 22 is free of contacting the plurality of arcuate corner portions 54. The plurality of arcuate corner portions 54 are engaged within the plurality of concave portions 111, respectively, for preventing relative rotation of the polygonal ball joint 5 and the main body 1.

Figure 6:
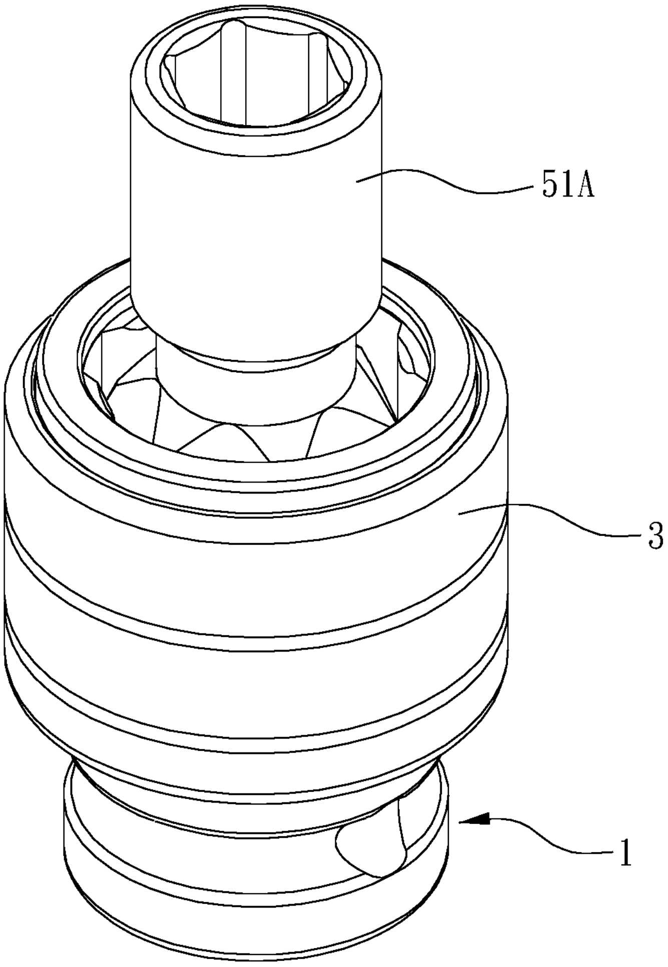
FIG. 6 is a stereogram of a second embodiment of the present invention.
Figure 7:
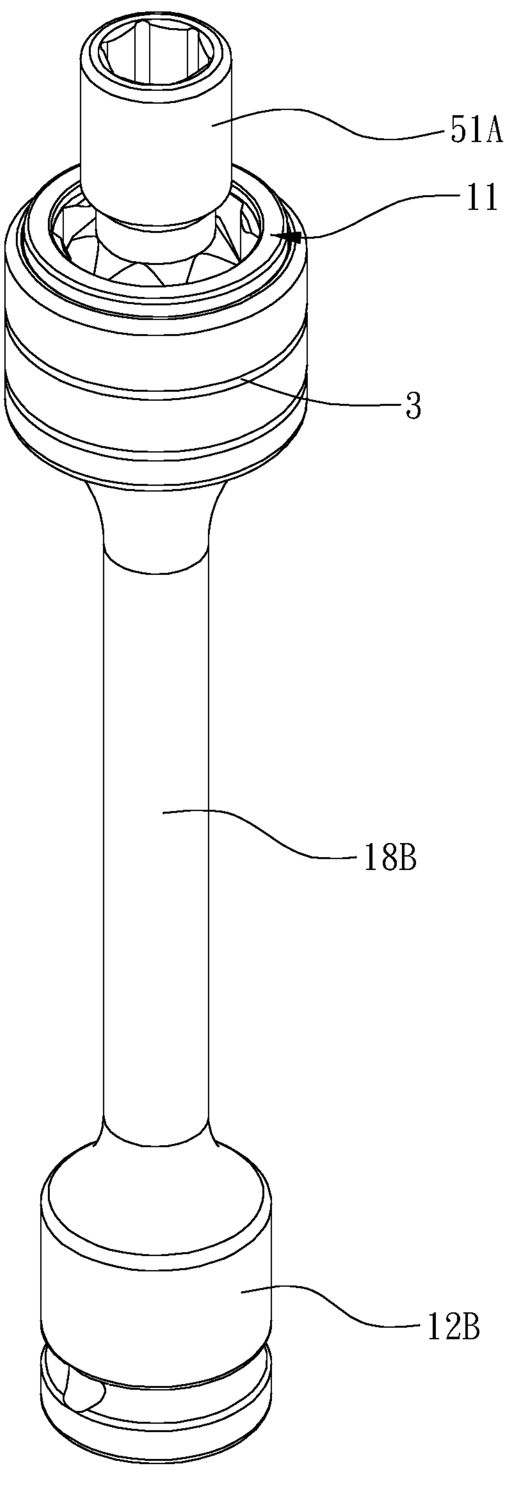
FIG. 7 is a stereogram of a third embodiment of the present invention.
Figure 8:
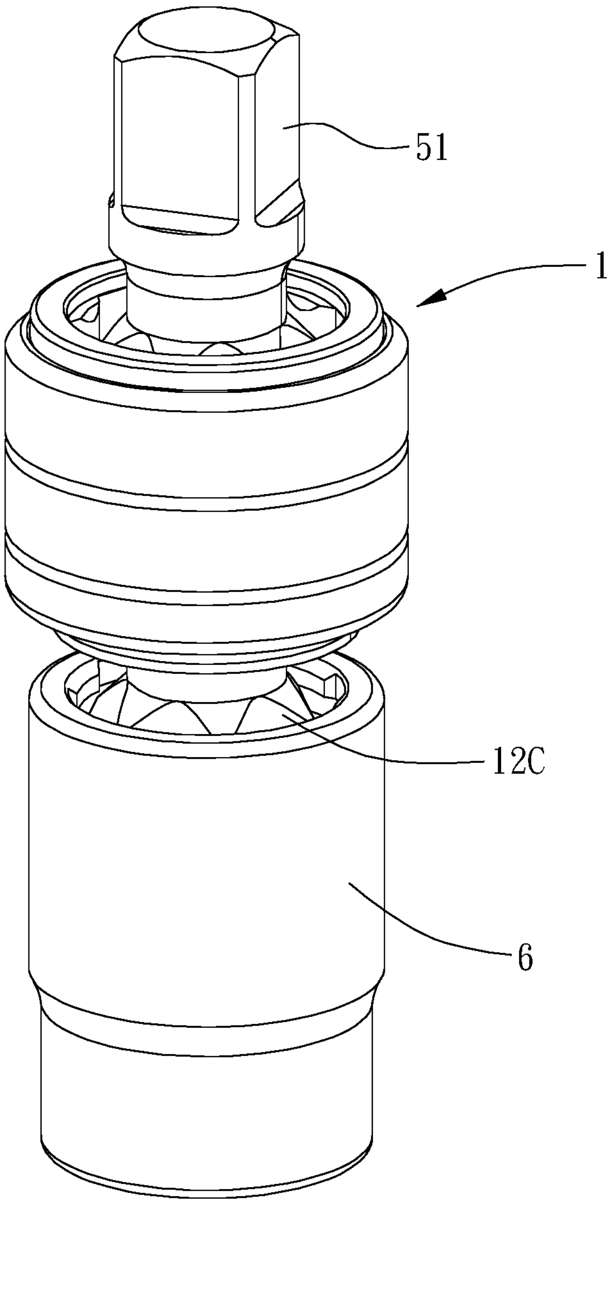
FIG. 8 is a stereogram of a fourth embodiment of the present invention.

In this embodiment, the assembling end 12 includes a socket portion, and the working portion 51 is a D-shaped connector. Please refer to FIG. 6, in a second embodiment of the present invention, the working portion 51A includes a socket portion. Please refer to FIG. 7, in a third embodiment of the present invention, the main body further includes an extension rod 18B which is connected between the chamber 11 and the assembling end 12B, thus expanding working range. Please refer to FIG. 8, in a fourth embodiment of the present invention, the assembling end 12C includes a polygonal ball head, and the assembling end 12C is configured to be swingably assembled to a socket 6, which provides the function of a two-piece universal joint.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A driving head-changeable tool, including:

a main body, including a chamber and an assembling end connected to each other, the chamber including a plurality of concave portions and a plurality of convex portions alternatively arranged circumferentially, the chamber being configured for insertion of a polygonal ball joint, the chamber further including at least one receiving hole disposed therethrough radially, each of the at least one receiving hole receiving a blocking member;

an outer sleeve, disposed around the main body, an inner wall of the outer sleeve including a recess and a projection protrusive relative to the recess, the outer sleeve being slidable between a first position and a second position relative to the main body;

wherein when the outer sleeve is located in the first position, the projection urges the blocking member to project within the chamber to retain the polygonal ball joint in the chamber; when the outer sleeve is located in the second position, the recess corresponds to the blocking member, the blocking member is retractable in the recess to be not protrusive within the chamber so that the polygonal ball joint is disengageable from the chamber;

wherein an end of each of the plurality of convex portions remote from a bottom of the chamber includes a bevel, the chamber further includes an annular groove adjacent to the bottom thereof, the driving head-changeable tool further includes a conical coil spring, the conical coil spring includes a large diameter end and a small diameter end opposite to each other, the large diameter end is engaged within the annular groove, and the small diameter end biases the polygonal ball joint outwardly;

wherein the chamber further includes a first stepped portion near an opening thereof, and the first stepped portion is next to the bevel.

2. The driving head-changeable tool of claim 1, wherein the main body further includes an extension rod connected between the chamber and the assembling end.

3. The driving head-changeable tool of claim 1, wherein an outer circumferential surface of the main body includes a large diameter section, a small diameter section and a retainer, an inner circumferential surface of the outer sleeve includes an inner flange, the inner flange is slidably restricted between the large diameter section and the retainer, and an elastic member is disposed around the small diameter section and abutted between the large diameter section and the inner flange so that the outer sleeve is biased toward the first position; a side of the inner flange remote from the elastic member includes a second stepped portion, and when the outer sleeve is located in the first position, the retainer is received within the second stepped portion; an end of the inner circumferential surface of the outer sleeve remote from the inner flange includes a flat section, when the outer sleeve is located in the first position, the large diameter section of the main body is protrusive beyond the flat section, and when the outer sleeve is located in the second position, the large diameter section of the main body is non-protrusive relative to the flat section; the polygonal ball joint includes a working portion and a polygonal ball head connected to each other, and end of the polygonal ball head remote from the working portion includes a circular end surface, the small diameter end is abutted against the circular end surface, a plurality of arcuate corner portions are connected to a periphery of the circular end surface, the plurality of arcuate corner portions extend radially, and the small diameter end is free of contacting the plurality of arcuate corner portions; the flat section and the projection have same thicknesses; the assembling end is configured to be assembled with a rotation tool; the retainer is C-shaped.

4. A driving head-changeable tool of claim 1, including:

a main body, including a chamber and an assembling end connected to each other, the chamber including a plurality of concave portions and a plurality of convex portions alternatively arranged circumferentially, the chamber being configured for insertion of a polygonal ball joint, the chamber further including at least one receiving hole disposed therethrough radially, each of the at least one receiving hole receiving a blocking member;

an outer sleeve, disposed around the main body, an inner wall of the outer sleeve including a recess and a projection protrusive relative to the recess, the outer sleeve being slidable between a first position and a second position relative to the main body;

wherein when the outer sleeve is located in the first position, the projection urges the blocking member to project within the chamber to retain the polygonal ball joint in the chamber; when the outer sleeve is located in the second position, the recess corresponds to the blocking member, the blocking member is retractable in the recess to be not protrusive within the chamber so that the polygonal ball joint is disengageable from the chamber;

wherein an outer circumferential surface of the main body includes a large diameter section, a small diameter section and a retainer, an inner circumferential surface of the outer sleeve includes an inner flange, the inner flange is slidably restricted between the large diameter section and the retainer, and an elastic member is disposed around the small diameter section and abutted between the large diameter section and the inner flange so that the outer sleeve is biased toward the first position.

5. The driving head-changeable tool of claim 4, wherein a side of the inner flange remote from the elastic member includes a second stepped portion, and when the outer sleeve is located in the first position, the retainer is received within the second stepped portion.

6. The driving head-changeable tool of claim 4, wherein an end of the inner circumferential surface of the outer sleeve remote from the inner flange includes a flat section, when the outer sleeve is located in the first position, the large diameter section of the main body is protrusive beyond the flat section, and when the outer sleeve is located in the second position, the large diameter section of the main body is non-protrusive relative to the flat section.

7. The driving head-changeable tool of claim 4, wherein the at least one receiving hole is disposed through the large diameter section.

8. A driving head-changeable tool, including:

a main body, including a chamber and an assembling end connected to each other, the chamber including a plurality of concave portions and a plurality of convex portions alternatively arranged circumferentially, the chamber being configured for insertion of a polygonal ball joint, the chamber further including at least one receiving hole disposed therethrough radially, each of the at least one receiving hole receiving a blocking member;

an outer sleeve, disposed around the main body, an inner wall of the outer sleeve including a recess and a projection protrusive relative to the recess, the outer sleeve being slidable between a first position and a second position relative to the main body;

wherein when the outer sleeve is located in the first position, the projection urges the blocking member to project within the chamber to retain the polygonal ball joint in the chamber; when the outer sleeve is located in the second position, the recess corresponds to the blocking member, the blocking member is retractable in the recess to be not protrusive within the chamber so that the polygonal ball joint is disengageable from the chamber;

wherein an end of each of the plurality of convex portions remote from a bottom of the chamber includes a bevel, the chamber further includes an annular groove adjacent to the bottom thereof, the driving head-changeable tool further includes a conical coil spring, the conical coil spring includes a large diameter end and a small diameter end opposite to each other, the large diameter end is engaged within the annular groove, and the small diameter end biases the polygonal ball joint outwardly;

wherein the polygonal ball joint includes a working portion and a polygonal ball head connected to each other, and end of the polygonal ball head remote from the working portion includes a circular end surface, the small diameter end is abutted against the circular end surface, a plurality of arcuate corner portions are connected to a periphery of the circular end surface, the plurality of arcuate corner portions extend radially, and the small diameter end is free of contacting the plurality of arcuate corner portions.

* * * * *